(12) United States Patent
Prado (10) Patent No.: US 9,542,418 B2
(45) Date of Patent: Jan. 10, 2017

(54) DEVICE FOR OPTICAL TIME-STAMPING, AND RELATED IMAGE-SENSING SYSTEM AND OPTICAL TIME-STAMPING METHOD

(71) Applicant: CENTRE NATIONAL D'ETUDES SPATIALES, Paris (FR)

(72) Inventor: Jean-Yves Prado, Portet sur Garonne (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 0 days.

(21) Appl. No.: 14/434,611

(22) PCT Filed: Nov. 20, 2013

(86) PCT No.: PCT/EP2013/074303
§ 371 (c)(1),
(2) Date: Apr. 9, 2015

(87) PCT Pub. No.: WO2014/082907
PCT Pub. Date: Jun. 5, 2014

(65) Prior Publication Data
US 2015/0242445 A1    Aug. 27, 2015

(30) Foreign Application Priority Data
Nov. 30, 2012    (FR) ...................................... 12 61504

(51) Int. Cl.
*H04N 5/232*    (2006.01)
*H04N 5/247*    (2006.01)
(Continued)

(52) U.S. Cl.
CPC ......... *G06F 17/30268* (2013.01); *G04F 13/02* (2013.01); *H04N 5/232* (2013.01); *H04N 5/247* (2013.01)

(58) Field of Classification Search
CPC .... G06F 17/30268; G04F 13/02; H04N 5/232; H04N 5/247; H04N 1/32144; H04N 1/32309; H04N 1/3232; H04N 1/32325; G03B 17/24; G03B 17/245
See application file for complete search history.

(56) References Cited

U.S. PATENT DOCUMENTS 3,386,364 A     6/1968  Hayden
3,829,869 A  *  8/1974  Balko ..................... G03B 15/00
                                                 346/107.1
(Continued)

FOREIGN PATENT DOCUMENTS

EP     0 549 436 A1    6/1993
JP     H01 216328 A    8/1989

OTHER PUBLICATIONS

International Search Report, dated Mar. 5, 2013, from corresponding PCT application.

*Primary Examiner* — Nicholas Giles
(74) *Attorney, Agent, or Firm* — Young & Thompson (57) ABSTRACT

Disclosed is an optical time-stamping device, including an optical instrument with a retina having a field of view and being able to produce on the retina images of the field of view, and a high accuracy reference clock signal receive. The time-stamping device also includes: a lighting source at a distance from the retina of an optical instrument, and configured to emit a light signal in the direction of the retina of an optical instrument and in the field of view of an optical instrument, and a control unit connected to the reference clock signal receiver by a first connection and to the lighting source by a second connection, and configured for controlling the lighting source for emitting a light signal in a synchronized way with the reference clock signal. An associated image sensing system and optical time-stamping method are also disclosed.

16 Claims, 6 Drawing Sheets

(51) Int. Cl.
G06F 17/30 (2006.01)
G04F 13/02 (2006.01)

(56) References Cited

U.S. PATENT DOCUMENTS

| | | | | |
|---|---|---|---|---|
| 5,513,103 | A | * 4/1996 | Charlson | G07F 17/3288 348/157 |
| 5,630,186 | A | * 5/1997 | Yamaguchi | G03B 17/245 396/300 |
| 2014/0085638 | A1 | * 3/2014 | Nikiforov | H02S 50/10 356/435 |
| 2014/0285096 | A1 | * 9/2014 | Cuppen | H05B 37/0272 315/153 |

* cited by examiner

DEVICE FOR OPTICAL TIME-STAMPING, AND RELATED IMAGE-SENSING SYSTEM AND OPTICAL TIME-STAMPING METHOD

FIELD OF THE INVENTION

The present invention relates to an optical time-stamping device comprising:
an optical instrument having a retina having a field of view and capable of shooting said field of view on said retina, and
a high accuracy reference clock signal receiver.
The field of the invention relates to optical time-stamping of images.

BACKGROUND OF THE INVENTION

In certain applications, for example in the field of amateur astronomy, it is of interest to accurately determine the instant of occurrence of an observable phenomenon based on a reference time, for example in order to then correlate the images taken from different geographical positions and obtain accurate information on this phenomenon.

In this scenario, the optical instrument for example corresponds to a camera or a photometer intended to shoot images of an eclipse of one star by another celestial body.

For dating the images, it is notably known how to provide the device with an electronic case connected to the output of the optical instrument and able to superpose onto the data transmitted by the optical instrument, a date representative of the reference time provided by the receiver.

This is for example described in document IOTA Observer's Manual published on the site of the IOTA association, which is the acronym for "International Occultation Timing Association". In this document, the reference clock signal is the GPS time signal which is a universal reference time.

The reference time receiver then transmits to the electronic case, a signal with one pulse per second in reference time, also known under the name of 1PPS signal, each pulse giving rise to synchronization of the internal clock of the electronic device with the reference time.

The date indicated by the internal clock of the case is then added as an overlay on the data from the optical instrument.

The case then delivers at the output a video flow which may be viewed on a screen and corresponding to the images from the optical instrument on which the date of the internal clock of the electronic case is displayed as an overlay.

However, this device has a certain number of drawbacks.

First of all, insofar that the electronic case is connected to the output of the optical instrument, the electronic case and the optical instrument must be compatible. Thus, the latter must have a compatible interface, and the electronic case should be able to read the format of the video data delivered by the optical instrument.

Further, the video flow delivered by the electronic case itself has a given format, which again induces compatibility problems of the video flow delivered with recording or read-out apparatuses.

Finally, the time-stamping of images imposes availability of viewing and recording means for the video flow leaving the electronic case, and therefore availability of a cumbersome piece of equipment incompatible with the conditions under which the sensing of images is generally achieved.

SUMMARY OF THE INVENTION

One of the objects of the invention is therefore to propose an optical time-stamping device which does not have these drawbacks.

For this purpose, the invention relates to an optical time-stamping device as described above, characterized in that the time-stamping device also comprises:
a lighting source at a distance from the retina of the optical instrument and configured for transmitting a light signal towards the retina of the optical instrument and in the field of view of the optical instrument, and
control means connected to the receiver of a reference clock signal by means of a first connection and to the lighting source by means of a second connection, and configured for controlling the lighting source for transmitting a light signal in a synchronized way with the reference clock signal.

According to other aspects of the invention, the device comprises one or several of the following technical features, taken individually or according to all the technically possible combination(s):
the device also comprises a case in which are integrated at least the reference clock signal receiver and the control means;
the case is electrically independent of the optical instrument and/or motionally secured to the optical instrument;
the light signal of the lighting source is adjustable in intensity and/or in wavelength and/or in pulse width;
the device also comprises a pulse database able to store a plurality of pulse files, each pulse file comprising a plurality of pulse commands each comprising at least intensity, wavelength and/or pulse width parameters of the light signal from the lighting source;
the device also comprises an event database able to store a plurality of event files, each event file comprising one or several frames each comprising an event date, a pulse file name, and a number of iterations of said pulse file;
the control means are programmed in order to read said event files, and for each of the frames of an event file, controlling, at the reference time event date and a number of times equal to the number of iterations of said pulse file appearing in said frame, the transmission by the lighting source of a sequence of intensity, wavelength and pulse width light signals corresponding to the intensity, wavelength and/or pulse width parameters which comprise the successive pulse commands, comprised in the pulse file, the name of which is found in the frame of the event file;
the device also comprises an auxiliary output able to deliver a signal with a high logic level when the control means produce the command of the lighting source, and with a low logic level in the opposite case;
the device comprises at least two distinct optical instruments, the lighting source being configured so as to emit a light signal towards at least one of the optical instruments and in at least one of the respective fields of view of the optical instruments;
said or each optical instrument is one of the elements of the assembly formed by a camera for observing in visible light, an infrared camera, a photometer.

The invention also relates to an image sensing system comprising at least two optical time-stamping devices as described above.

The invention also relates to an optical time-stamping method applied by means of at least one optical time-stamping device as described above, the method comprising:
a lighting step, during which the lighting source of said or each time-stamping device emits at least one light signal towards the retina of at least one of the corresponding optical instruments and in the field of view of the corresponding optical instrument(s), said or each light signal being synchronized with the reference time, an image sensing step occurring at least partly during the lighting step, during which said or each optical instrument of said or each time-stamping device senses images of their field of view on which said at least one light signal may be viewed, and a dating step, during which a date in the reference time of the images made by said or each time-stamping device is determined.

According to other aspects of the invention, the method comprises one or more of the following technical features, taken individually or according to all the technically possible combination(s):

- the method also includes a preliminary step during which the optical instruments of the device are laid out so that the fields of view of the optical instruments have a portion common to all the fields of view, and during the lighting step, the lighting source emits at least one light signal in said common portion towards respective retinas of the optical instruments;
- during the image sensing step, the field of view of said or of each optical instrument is oriented towards an observable phenomenon, and during the dating step, the date of the observable phenomenon is determined in a reference time from the wavelength and/or the intensity of light signal(s) from the lighting source of said or of each time-stamping device and viewable on the corresponding images;
- the method is applied by means of at least two time-stamping devices respectively associated with at least one of the points of a path on which moves an object, and during the image sensing step, images are taken on which the object is located at the points with which are associated the time-stamping devices, and during the dating step, the time interval having elapsed between the passages of the object at the path points is at least determined in the reference time; and
- the method is applied by means of at least two time-stamping devices as described above, the databases of said at least two time-stamping devices comprising the same event files and the same pulse files, and during the dating step, the images from at least two time-stamping devices are collected and matched with the images from at least two time-stamping devices from differences between the wavelengths and/or the intensities of the light signals which may be viewed on the respective image shots of at least two time-stamping devices.

BRIEF DESCRIPTION OF THE DRAWINGS

The invention will be better understood upon reading the detailed description which follows, only given as an example and made with reference to the appended figures, wherein.

DETAILED DESCRIPTION OF THE INVENTION

The optical time-stamping device according to the invention is intended to allow time-stamping in reference time of an observable phenomenon, such as for example an eclipse of a star by another celestial body, the re-entry of debris or meteors into the earth's atmosphere or a specific phenomenon during atmospheric storms (sprites, elves, blue jets, etc.), The device is also a means for calibrating and checking a complex image sensing system, for example one or several telescopes or photometers on the ground or space-borne.

Figures 1, 2:
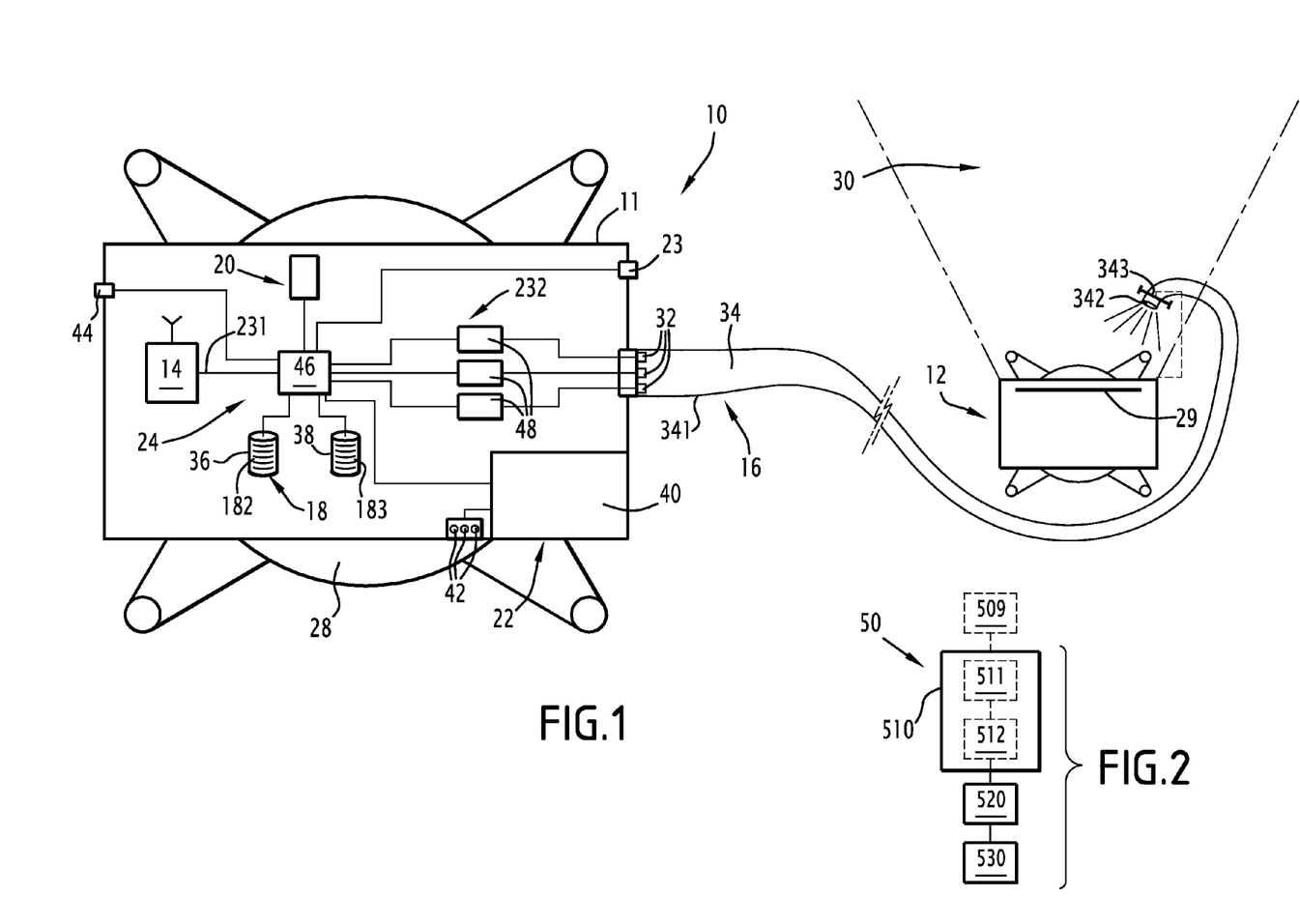
FIG. 1 is a schematic illustration of a top view of a time-stamping device according to the invention.
FIG. 2 is a block diagram of an optical time-stamping method according to the invention.

With reference to FIG. 1, the optical time-stamping device 10, hereafter the device 10, comprises a case 11, an optical instrument 12, a receiver of a reference clock signal 14 and a lighting source 16. Further, the device 10 comprises means for storing data 18, means 20 for supplying electric power and an external interface 22. Finally, the device 10 comprises an auxiliary output 23, control means 24 and a stabilizing leg 28 on which the case 11 is attached.

The case 11 is able to contain, support and protect some of the members of the device 10. At least the receiver 14 and the control means 24 are contained in the case 11.

The case 11 has a general parallelepipedal shape and thus has two side faces, a front face, a rear face, an upper face and a lower face.

The case 11 is for example made in polycarbonate.

The case 11 has a length comprised between 150 mm and 200 mm, and preferably equal to 200 mm, a width comprised between 50 mm and 80 mm, and preferably substantially equal to 80 mm, and a height comprised between 10 mm and 30 mm, and preferably equal to 30 mm.

The case 11 has a mass comprised between 50 g and 100 g.

The case 11 is independent of the optical instrument 12, i.e. it is neither motionally connected nor secured to the optical instrument 12. Alternatively, the case 11 is motionally secured to the optical instrument 12 but is not electrically connected to the optical instrument 12.

The optical instrument 12 comprises a retina 29 having a field of view 30. The optical instrument 12 is able to sense images of its field of view 30 on the retina 29 at a given frequency f sequentially. The images taken are stored by the optical instrument 12, for example on film or on a digital storage memory board.

In the example of FIG. 1, the optical instrument 12 is a camera for observation in visible light provided with a stabilizing leg. The retina 29 for example appears as one or several photographic sensors such as CCD (Charge-Coupled Device) sensors.

For example, the camera has an image sensing frequency f of 50 images per second, which corresponds to the PAL standard. Alternatively, this frequency f has the value of 60 images per second, which corresponds to the NTSC format. Still alternatively, the frequency f may be greater than 60 images per second, which is for example the case when the optical instrument 12 is a digital instrument.

In a known way, an image taken by the optical instrument 12 corresponds to the result of accumulation of photons moving in the field of view towards the retina 29 of the optical instrument 12 over a period substantially equal to 1/f.

The spatial layout of the viewable objects in the field of view is then retained on the images.

Alternatively, the optical instrument 12 is a photometer.

Alternatively, the optical instrument 12 is any element from the group formed by a camera for observing visible light, an infrared camera, a photometer.

Alternatively, the device 10 comprises several optical instruments 12. The optical instruments 12 of such a device 10 are respectively comprised in the group formed by: a camera for observing visible light, an infrared camera, a photometer.

In this alternative, the lighting source 16 is able to emit a light signal towards the retina 29 of at least one of the optical instruments 12 and in the corresponding field of view. This is described in more detail in the following.

The optical instrument 12 has a specific time determined by an internal clock which it includes. The images taken with the optical instrument 12 are dated in the specific time of the optical instrument 12.

The receiver of a reference clock signal 14, hereafter the receiver 14, is contained in the case 11 and is able to receive information on a reference time and deliver to the control means 24 a signal synchronized with the information of the received reference times.

In the example of FIG. 1, the reference time is GPS time, and the receiver 14 is a GPS receiver able to sense time information emitted by the corresponding satellites. Alternatively, the receiver 14 is a GLONASS receiver or a GALILEO receiver and the reference time is GLONASS or GALILEO time.

The time information of the receiver 14 has an accuracy of the order of $10^{-9}$ s. The signal delivered by the receiver 14 to the control means 24 is for example a so-called 1PPS (1 pulse per second) signal, a signal pulse being transmitted at each new second in the reference time.

As this will be seen subsequently, each new pulse of the 1 PPS signal gives rise to re-synchronization of the internal clock of the control means with the 1PPS signal and therefore the reference time, so that the control means are synchronized with the reference time.

The lighting source 16 is able to emit a light signal which may be adjusted in intensity, wavelength and pulse width (i.e. in duration) towards the retina of the optical instrument 12 and in the field of view 30 of the optical instrument 12.

By <<light>> is meant visible or infrared light.

The lighting source 16 is at a distance from the retina 29 of the optical instrument 12.

The emitted light signal is located in a portion of the electromagnetic spectrum which the retina 29 of the optical instrument 12 is able to detect.

The lighting source 16 comprises three monochromatic light sources 32 able to emit respective light radiation, and a wave guide 34.

The three light sources 32 are a light-emitting diode LED in the following, with a red color at 625 nm, a LED with a green color at 527 nm, and a LED with a blue color at 470 nm.

The light sources 32 are positioned on the front face of the case 11 and are attached on the corresponding wall.

The wave guide 34 is able to allow propagation of photons emitted by the lighting source as far as the field of view 30 of the optical instrument 12 and towards the retina 29, as well as to combine the light radiations respectively emitted by the light sources 32, so that the resulting light signal is thus adjustable in wavelength.

The wave guide 34 has a first end 341 connected to the lighting source 16, and a second end 342 shifted as far the field of view 30 of the optical instrument 12.

The second end 342 of the wave guide 34 is positioned in the field of view 30 of the retina 29 of the optical instrument 12 and is oriented towards the retina 29. For example, the second end 342 is positioned so that the photons conducted by the wave guide 34 may be viewed in one of the corners of the field of view 30 of the optical instrument 12.

In practice, the second end 342 is immobilized in its position by an orientable attachment means 343 and added to the wave guide 34, for example a telescopic leg.

The attachment means is independent of the optical instrument 12.

Alternatively, the attachment means 343 is motionally secured to the optical instrument so that the relative position of the second end 342 and of the retina 29 is retained when the retina 29 and the field of view 30 are changed. This is advantageously applied when the optical instrument is configured so as to have its field of view 30 shift during its operation.

In the example of FIG. 1, the wave guide 34 is an optical fiber provided with an optical mixer (not shown) able to combine the light radiations in order to form the light signal. The photons from the lighting source 16 and conducted through the optical fiber may subsequently be viewed in the right lower corner of the images of the field of view 30.

Alternatively, the wave guide 34 comprises three optical fibers side by side and respectively associated with one of the light sources. The mixing of the light radiations from the light sources then naturally takes place at the second end 342.

The data storage means 18 are located in the case 11 and comprise a pulse database 182 containing pulse files 36, and an event database 183, containing event files 38.

A pulse file 36 appears as a text file containing information encoding the shape of the light radiation emitted by each of the light sources 32.

A pulse file 36 for example appears in the following form:
$ 00 10 12 3C 5B #
$ 00 20 13 3C 59 #
$ 00 01 14 3C 57 #
$ 00 10 15 3C 55 #
$ 01 00 15 3C 53 #

Each line of the pulse file 36 specifies a pulse, i.e. upon emission by the light sources 32 of light radiation in the field of view 30.

The characters $ and # respectively code the beginning and the end of the pulse.

The first bytes encode the duration of the pulse and therefore of the light radiation (in ms).

The following bytes respectively encode the luminosity of the red, green and blue LEDs (the value of these bytes is comprised between h00 and hFF).

The name of the file appears in the following form: "IXX.txt", wherein XX corresponds to the rank of the pulse file 36 in the pulse database 182, as this will be seen.

A pulse file 36 is for example associated with a given light source 32, or further with a light signal form emitted by the lighting source 16 which is peculiar.

As this will have been understood, any waveform may thus be encoded in one or several pulse files 36, the corresponding wave then being restored by the corresponding light source(s) 32 during operation of the device 10, as this will be seen subsequently.

It should be noted that depending on the conditions under which the device 10 is intended to be used, for example at night or in daylight, the intensity of the light signals provided in the pulse files 36 is adapted according to criteria well known to one skilled in the art, and this in order to limit dazzling of the optical instrument 12.

An event file 38 appears as a text file containing frames coding an event, i.e. the emission by the lighting source of a sequence of light radiations, at a date in reference time.

An event file 38 comprises a plurality of frames, each frame for example having the following form:

@ JJ MM AA HH MM SS XX TT £, wherein @ and £ respectively code the beginning and the end of the frame, JJ, MM, AA, HH, MM, SS respectively code the day of the month, the month, the year (20AA is implied), the hour, the minute and the second of the event, XX coding the rank of a pulse file 36 in the pulse database 182, and TT being the number of iterations of the pulse file 36 to be made during the event.

Thus, by taking for example the frame "@ 22 06 12 22 05 00 01 10 £", the associated event corresponds to emission by the lighting source 12, at 22 h05 min and 0 seconds, on Jun. 22 2012, from the sequence of pulses contained in the pulse file I01.txt, and this 10 times in a row.

If the value TT is reset to zero, the pulse sequence is repeated ad infinitum.

The name of an event file 38 appears in the form EXXXX-.txt. The event database also comprises a file EEEEE.txt for which reading by the control means 24 marks the end of an event, as this will be seen subsequently.

The pulse 36 and event 38 files are elaborated on a distinct computer and are transferred into the data bases 182, 183, for example via the external interface 22.

The power supply means 20 are able to supply the members of the device 10 with electric power, except for the optical instrument 12. They are located in the case 11.

The power supply means 20 comprise four 1.5 V batteries. Alternatively, the power supply means comprise a rechargeable battery.

It should be noted that in practice, the electric power supply of the members of the device 10 may be achieved through the external interface 22, as this will be seen.

The external interface 22 is located in one face of the case 11 and is able to allow configuration of the device 10, the viewing by the operator of the contents of these files stored in the storage means 18, and the connection of the device 10 to a remote computer.

For this purpose, the external interface comprises a digital display screen 40, a plurality of push buttons 42, and a USB (Universal Serial Bus) interface 44.

The digital display screen 40 is able to perform display of information concerning the device 10, such as the locking state of the reference time signal, the name of the file or of the files 36, 38 which are executing, error messages, to allow switching between the files during execution, for example via push buttons 42, performing the display of a piece of information representative of the available electric energy amount in the power supply means 20, or further the contents of the files stored in the storage means 18.

In a known way, the USB interface 44 allows connection of the device to a computer. This connection then allows exchange of files between the device 10 and the computer, such as transfer towards the device 10 and the storage means 18 of new pulse 36 or event 38 files, or further suppression of the files contained in the storage means 18.

It should be noted that it is preferable to not allow modification of the pulse 36 and event 38 files via the display screen 40 for reasons which will become obvious in the following.

The auxiliary output 23 is designed for connecting a point-like light source to the device 10, such as for example an optical fiber. The auxiliary output 23 is found on the front face of the case 11, and has a mechanical interface for attaching the point-like light source.

The control means 24 are able to control the lighting source 16 according to the content of the pulse files 36 and of the event files 38, to communicate with the reference time receiver 14, to drive the external interface 22 and the auxiliary output 23 and to access the storage means 20.

For this purpose, the control means 24 comprise a processor 46 and three digital/analog converters 48, hereafter D/A converters 48.

The processor 46 is a programmable logic circuit FPGA (Field Programmable Gate Array).

The processor 46 is connected to the reference time receiver 14 via a first connection 231, as well as to the screen 40, to the USB interface 44, to the external output 23 and to the databases 182, 183.

Further, it is electrically connected to the D/A converters 48 which are themselves respectively electrically connected to one of the light sources 32. These electric connections via the D/A converters 48 form a second connection 232 connecting the control means 24 to the lighting source 16.

As indicated earlier, from the signal delivered by the receiver 14, the control means 24 are configured so as to cyclically synchronize their internal clock with the reference time. In the case of a 1PPS signal, at each new pulse of the signal provided by the receiver 14, the control means 24 reset to zero the values of the internal clock corresponding to quantities of less than one second: tenths of a second, hundredths of a second, thousandths of a second, etc.

For controlling the lighting source 16, the processor 46 is able to sequentially read the event files 38 and for each of the frames, access the pulse file 36 appearing in the frame.

The processor 46 is then programmed for emitting at dates taken in its own time synchronized on the reference time and provided in the event files 38, a digital signal representative of the intensity and duration data read in the pulse files 36 intended for each of the D/A converters 48.

For driving the auxiliary output 23, the processor 46 is able to emit a signal with a high logic level when it achieves control of the lighting source 16, and a signal with a low logic level in the opposite case.

In the example of FIG. 1, the signal emitted by the processor 46 is a TTL signal with a low logic level comprised between 0 V and 0.5 V, and with a high logic level comprised between 2.5 V and 5 V.

The D/A converters 48 are respectively connected to one of the light sources 32 and are able to transform the digital signal received from the processor 46 into an analog signal with equivalent contents and intended for the corresponding light source 32.

Alternatively, the lighting source 16 comprises a single light source 32 consisting of a polychromatic LED. In the pulse files 36, the color of the radiation from the light source 32 is encoded over several bytes, its luminosity being encoded on one or several bytes.

Still alternatively, the lighting source 16 only comprises a single light source 32 consisting of a monochromatic LED, the optical signal only being adjustable in intensity and in pulse width. In the same way as in the alternatives described above, the device 10 only comprises one D/A converter via which the processor 46 is connected to the lighting source 16, and the pulse files 36 are encoded accordingly.

Still alternatively, the information relating to the emission instant of the light signals and encoded in the frames of the event files 38 are directly encoded in the pulse files 36.

Each pulse comprises one or several bytes corresponding to the instant at which the pulse is made as well as to the number of iterations of the pulse.

This alternative is advantageously applied when the targeted application does not require emission by the lighting source 16 of light signals of complex shape.

The operation of the device 10 according to the invention and the optical time-stamping method 50, hereafter the method 50, according to the invention will now be described with reference to FIGS. 2 and 3.

Once the device 10 is started, the control means 24 and more specifically the processor 46, carry out sequential reading of the event files 38 contained in the event database 183. The processor 46 then reads the pulse files 36. Covering the files by the processor 46 ends once that the file EEEE.txt is read.

The data read are loaded in the memory of the processor 46. At the dates contained in the memory of the processor—i.e. at the dates in reference time because of the cyclic synchronization of the internal clock of the processor with the reference time—, the processor emits respective digital signals intended for the D/A converters 48. Each signal contains luminosity and pulse width information of the light radiation to be emitted by the corresponding light source. This digital signal is converted into an analogue signal by the corresponding D/A converter 48, and then sent to the associated light source 32. The light sources 32 then emit their light radiation with an intensity and for a duration corresponding to the pieces of information encoded in the files 36, 38.

The method 50 will now be described with the scope of a first embodiment. The application of the first embodiment gives the possibility of dating in reference time an observable phenomenon, for example an eclipse or a meteor phenomenon.

During a lighting step 510, emission of a light signal or of a sequence of light signals is carried out via the lighting source 16 towards the retina 29 of the optical instrument 12 and in the field of view 30 of the optical instrument 12. This emission is for example carried out a few tens of seconds before occurrence of the phenomenon. In practice, for certain types of phenomena such as eclipses, the occurrence instant of the phenomenon which is desirably dated in reference time is known a priori to within a second.

Advantageously, during the lighting step 510, repeated emission of a light signal with a set duration and/or a regular frequency is carried out for example at a frequency of the order of one minute. This is particularly advantageous when it is not possible to estimate a date for the occurrence of the absolute phenomenon—which for example is the case when the phenomenon which is desirably observed is of a meteor nature—and when it is preferable to minimize the light signal of the lighting source in order to not risk being detrimental to the quality of the observation by multiplying the light signals. In practice, this repeated emission is associated with one or several pulse 36 and/or event 38 dedicated files.

During an image sensing step 520 which occurs at least partly concomitantly with the lighting step 510 and during the occurrence of the phenomenon which is desirably observed, images of the field of view 30 are taken, via the optical instrument 12, in which field the observable phenomenon occurs.

This concomitance criterion at least partly has the consequence that the trace of a light signal appears on at least one of the images.

The light signals emitted by the lighting source may be viewed in the field of view 30 and therefore subsequently on the images taken during this image sensing step 520.

As indicated earlier, a sequence of light signals is associated with one or several event 38 and/or pulse 36 files.

Also, advantageously, during the lighting step 510, switching is manually performed between two sequences of distinct light signals. This allows an operator to adapt the sequence of light signals when he/she detects the beginning of the phenomenon which he/she wishes to observe and for which he/she was not aware of the date of occurrence a priori. This switching is for example performed via push buttons 42 by which the operator modifies the selection of the pulse 36 and/or event 38 files during execution.

Alternatively, this switching is carried out automatically, for example by means of a computer connected to the device 10 via the USB interface 44 and to the optical instrument 12 and configured so as to control the device 10 for switching between pre-established event files 38 depending on the luminosity of the images taken by the optical instrument 12 or on a movement occurring in the field of view 30.

Figure 3:
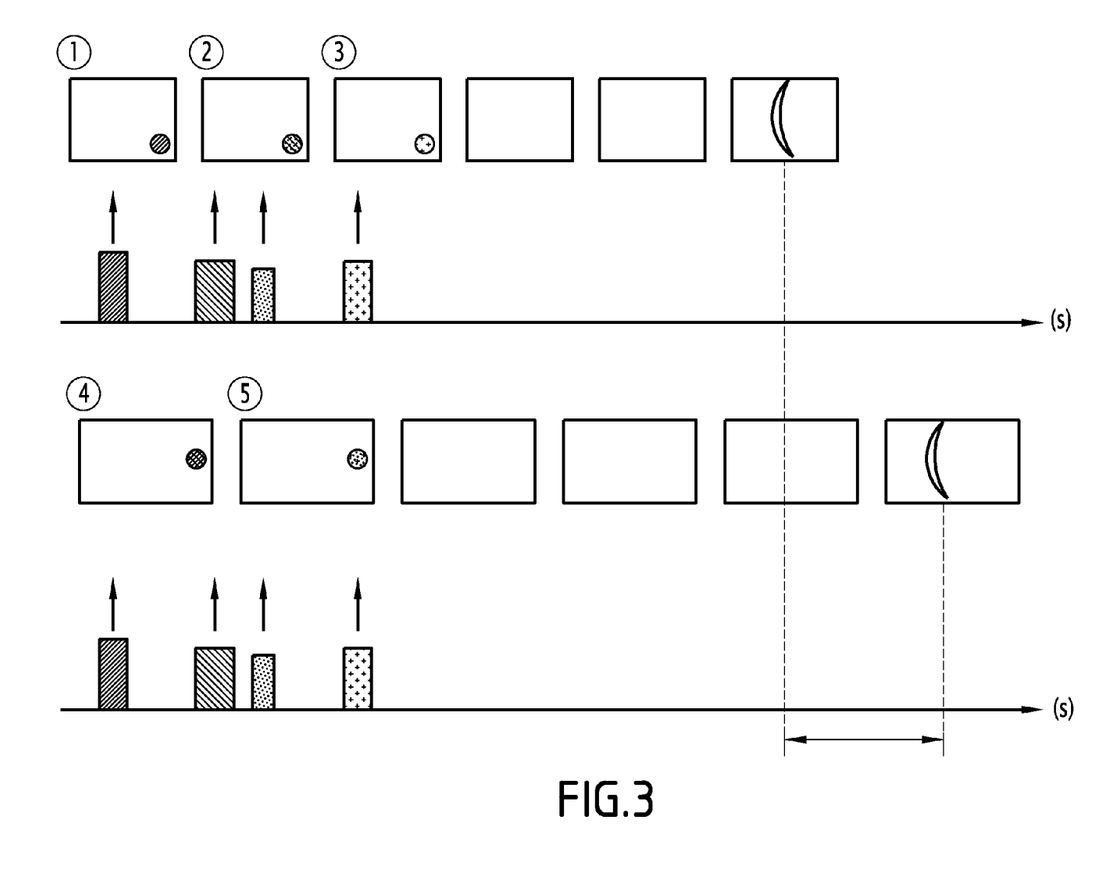
FIG. 3 is a schematic illustration of images taken by several devices according to the invention during the method according to an alternative of the invention.

The upper part and the lower part of FIG. 3 illustrate the course of the lighting 510 and image sensing 520 steps.

Each rectangle schematically represents an image produced by the optical instrument. These images are produced at frequency f, this frequency depending on the optical instrument 12.

In this FIG. 3, the rectangles having patterns correspond to images on which a light signal has been recorded. The width of the rectangles located under the images represents the duration of the light signal, the height, its intensity, and each pattern corresponds to a given wavelength.

In image 1, only a light signal is captured.

In image 2, insofar that two light signals with distinct wavelengths are emitted during the duration 1/f corresponding to the image, the color which may be viewed on this image corresponds to the sum of the colors of both light signals.

The low portion of FIG. 3 is a similar view to that of the high portion but for an optical instrument having a different image sensing frequency f (in this case lower).

Consequently, for a same sequence of light signals, the colors which may be viewed on the images produced by these optical instruments 12 may be different.

During a dating step 530 of the method, a date is determined in reference time of the images produced during the image sensing step 520. As this will be seen, this allows the occurrence of the observable phenomenon to be dated in reference time.

By knowing the date, the intensity and the color and/or the duration of the light signals emitted during the lighting step 510, the date of the different images on which a light signal appear in the right lower corner, is determined in reference time.

To do this, with reference to FIG. 3, and for example by taking the images 1 to 3, the light signal which may be viewed on the image 1 means that this image sensing took place concomitantly with the emission of a first light signal and that it was achieved before the beginning of the following signal.

By analyzing the image 2, it is inferred that the latter took place after the end of the first light signal and that the date of the beginning of its period 1/f—i.e. the beginning of the accumulation of the photons which will give rise to the image—is before the beginning of the next signal.

By analyzing the image 3, it is known that the latter began after the date of the end of the last light signal produced, and that a single light signal took place during its production.

By integrating all this information, a date of these images is then determined in reference time.

From these obtained dates and from the datum of the image sensing frequency f of the optical instrument 12, from the number of images inserted between these dated images and those of the observable phenomenon, the time elapsed between the dated images in reference time and the images are determined, on which the observable phenomenon may be viewed.

In practice, in spite of the inaccuracy relating to the frequency f, dating the occurrence of the phenomenon in reference time is obtained to within $10^{-6}$ when the optical instrument 12 is a camera, and down to $10^{-9}$ when the optical instrument 12 is a photometer.

Advantageously, during the lighting step 510, at least some of the signals emitted by the lighting source 16 are emitted at a wavelength and at an intensity which do not vary during the emission, and have a pulse width greater than or equal to 2/f. This is expressed by the fact that the relevant signal is generally visible on three images including one during the entire time when the light source 16 was emitting.

Subsequently this allows accurate dating of these three images from the intensity of the light signal which may be used on both images, during which the light signal began, ended respectively. Indeed, the ratio between the intensity of the light signal on both of these images allows determination of the respective fractions of the duration 1/f of both images during which the light signal occurred.

In the device according to the invention, the time-marking in reference time of the images is achieved by means of the emission of a light signal emitted towards the retina of the optical instrument 12, the case 11 and the optical instrument 12 are made independent of each other both mechanically and electrically and therefore notably from the point of view of the format of the data.

This has the effect of simplifying the required device for achieving dating of an observable phenomenon in reference time and facilitating its application for dating an observable phenomenon.

As an alternative of method 50, still with reference to FIG. 3, the lighting step 510 comprises a first sub-step 511 and a second sub-step 512 (schematically illustrated in dotted lines in FIG. 3), during each of which an emission of a sequence of light signals is achieved by the lighting source 16 towards the retina 29 of the optical instrument 12 and in its field of view 30.

The first sub-step 511 preliminarily occurs upon the occurrence of the observable phenomenon, and the second step 512 occurs after the predicted date of occurrence of the phenomenon.

This alternative is advantageously applied in order to control and compensate for a possible shift in the image sensing frequency f of the optical instrument 12 over time.

Indeed, certain types of apparatuses with an objective are subject to drifts in the frequency f at which they produce images, for example because of temperature.

Within the scope of this alternative, during the dating step 530, the date of the images after the occurrence of the observable phenomenon is determined in reference time, and these dates are compared with the expected dates inferred from the dates of the images in reference time stemming from the first sub-step 511 and from knowledge of the frequency f.

From the thereby obtained deviation, the calculated date of the images on which appears the observable event, is compensated, for example by linear interpolation. Thus, is applied to the calculated date, the deviation provided with a weighting factor corresponding to the ratio between the duration involved between the date of the last image resulting from the first lighting step 511 and the image on which appears the phenomenon on the one hand, and the duration involved between the date of the first image on which appears a light signal resulting from the first lighting step 511 and the date of the first image on which appears a light signal resulting from the second lighting step 512 on the other hand.

Alternatively, the optical instrument 12 is an infrared camera.

Within the scope of this alternative, the lighting source 16 comprises one or several LEDs able to emit radiation in the portion of the infrared range which the retina 29 of the optical instrument 12 is able to detect.

The control means 24 then comprise as many D/A converters 48 as the device 10 comprises light sources.

Still alternatively, the optical instrument 12 is a photometer.

In a known way, a photometer is intended for measuring the intensity of the radiation of a star or of a phenomenon in a given range of wavelengths. It is then common to couple several photometers having working wavelength ranges which are complementary to each other so as to maximize the portion of the electromagnetic spectrum in which the radiation of the phenomenon is observed.

A photometer image achieves summing of the photons in its field of view 30 during the duration 1/f in order to determine the intensity of the observed radiation and does not retain the spatial positioning of these photons. The result of the images produced by a photometer appears as a diagram representing the variation of the intensity of the radiation of the observed phenomenon versus time.

Within the scope of this alternative, the lighting source 16 comprises at least one light source 32 able to emit radiation in the range of wavelengths of the optical instrument 12.

When the dating method 50 applied by means of a device 10 according to this alternative of the invention, and insofar that the range of wavelengths of a photometer may be narrow, during the lighting step 510, modulation of the signal of the light source 16 is preferably achieved in intensity rather than in wavelength.

Figure 4:
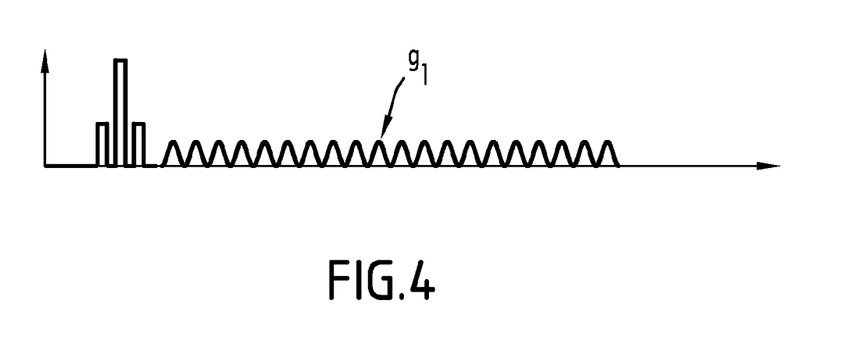
FIG. 4 is a schematic illustration of the shape of a light signal emitted by a lighting source from one or several devices according to the invention in an alternative of the method of FIG. 2.

FIG. 4 provides as an example a curve $g_1$ of the time-dependent variation of the intensity of the signal emitted by a lighting source 16 during the lighting step 510 of the time-stamping method 50 according to this alternative of the invention.

Figure 5:
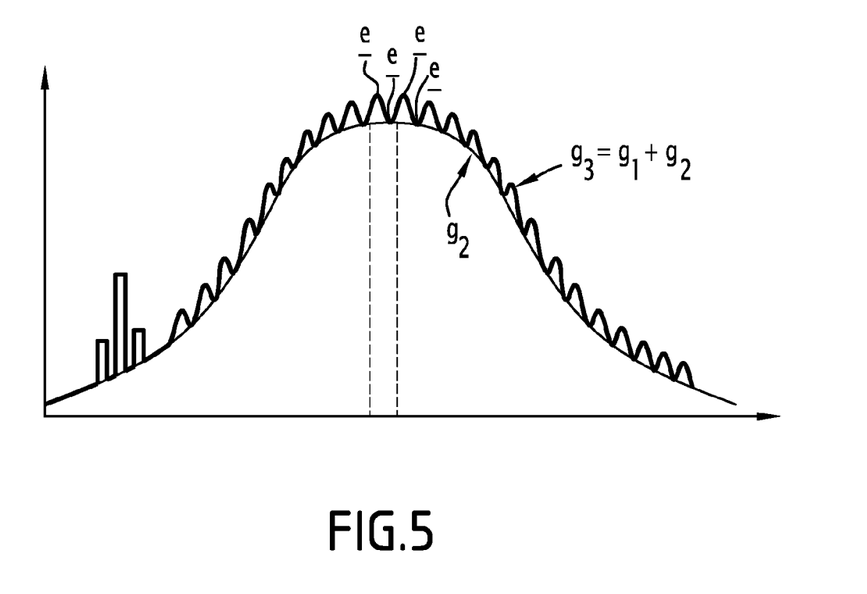
FIG. 5 is a schematic illustration of images taken by a device according to the invention during an alternative of the method of FIG. 2.

FIG. 5 illustrates a curve $g_2$ of an example of the time-dependent variation of the intensity of the radiation of the observable phenomenon which would be obtained by the photometer in the absence of a light signal from the lighting source 16, on the one hand and a curve $g_3$ of the time-dependent variation of the intensity of the radiation of the observed phenomenon for emission by the lighting source 16 of the sequence of light signals of FIG. 4, on the other hand.

In other words, the curve $g_3$ corresponds to the sum of the curves $g_1$ and $g_2$.

With reference to FIGS. 4 and 5, still within the scope of this alternative, during the lighting step 510, for example the emission by the lighting source 16 of a sequence of light signals is achieved, alternatively exhibiting an intensity having the value of 10% and 30% of the maximum intensity of the light source(s) (left portion of FIG. 4).

Still in the same embodiment, or else in another embodiment of the dating method 50 according to this alternative, during the lighting step 510, emission by the lighting source 16 of a wave with a sinusoidal shape of low amplitude as compared with the expected intensity of the radiation of the phenomenon which is desirably observed is achieved and on which the photometer with which the lighting means 16 are coupled, is calibrated (right portion of FIG. 4).

In a known way, the sinusoidal shape of the wave induces a relative deviation with the expected intensity which may easily be measured. By knowing the sinusoidal shape and more specifically its period, it is possible to ascertain and correct a possible shift in the period f during the dating step 530.

Within the scope of this alternative, in order to determine a date of the phenomenon in reference time, the time interval between this instant and the neighboring local extreme ends e, for which the date is known in reference time via the event 38 and pulse 36 files, is measured and which may be viewed on the diagram representing the intensity of the radiation of the phenomenon stemming from the images of the photometer(s) as illustrated in FIG. 5.

In order to again find the useful signal, i.e. the intensity of the radiation of the phenomenon which would be observed without any light signal from the lighting source 16, the value of the intensity of the signal of the light means at relevant instants is subtracted from the obtained curve, this value of the intensity versus time also being known.

This alternative is advantageously applied for allowing accurate dating of several elements occurring at various moments of the observation of the phenomenon while preventing risks of dazzling the optical instrument 12 because of the low amplitude of the emitted light signal.

Indeed, producing the light signal during the observable phenomenon, and therefore the presence of local extreme ends of the emitted illumination, the date of which is easily determined in reference time, gives the benefit of closer marking points for any event of interest occurring during the observable phenomenon. This then prevents the requirement of compensating for a possible shift in the frequency f.

Alternatively, the dating method 50 is applied by means of at least two devices 10 according to the invention.

Figure 6:
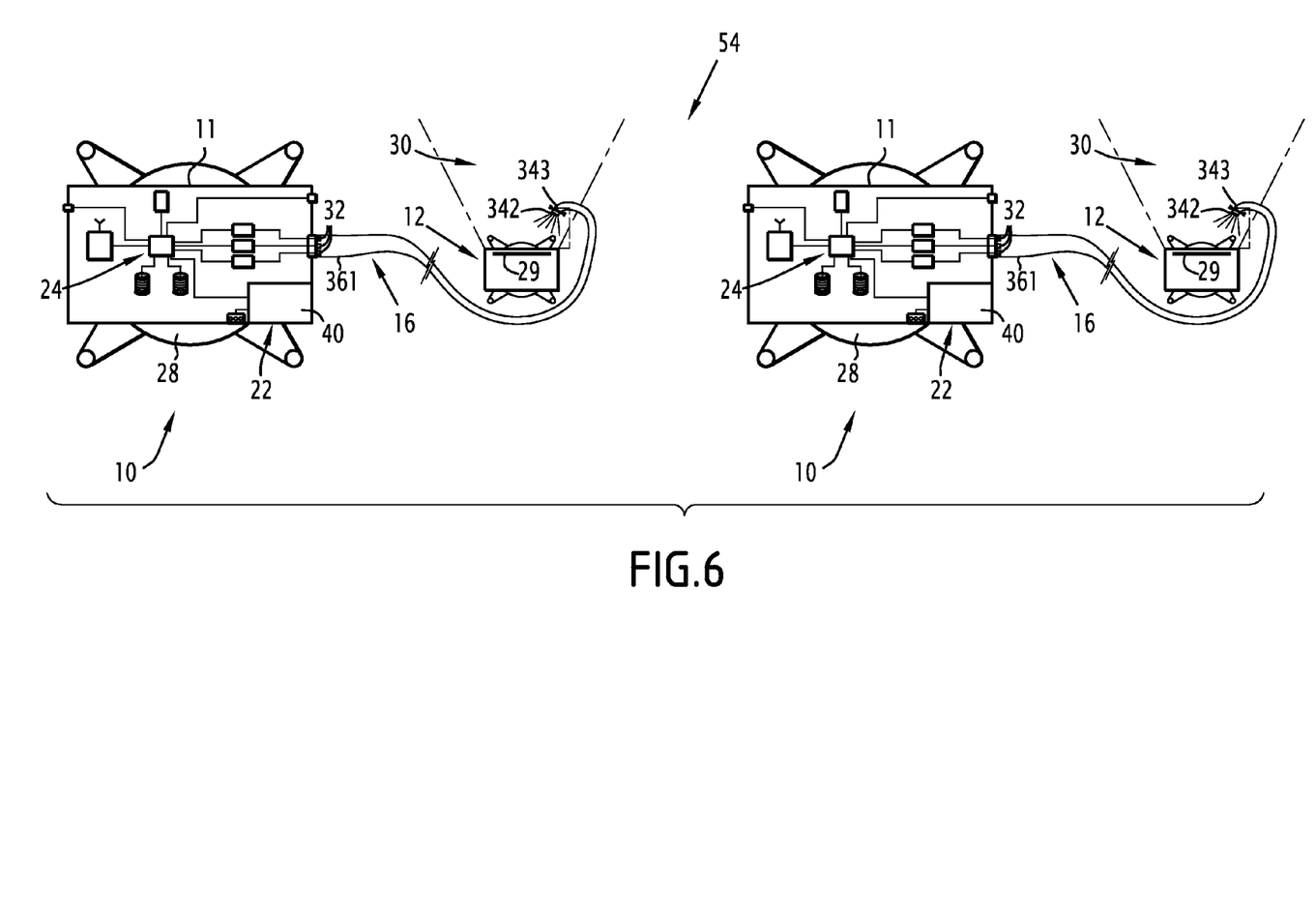
FIG. 6 is a schematic illustration of an image sensing system according to the invention.

With reference to FIG. 6, both devices 10 according to the invention form an image sensing system 54 according to the invention.

This alternative is advantageously applied for refining the dating in reference time of an observable phenomenon when the observation is carried out simultaneously from several devices 10 but that the latter are located in distinct geographical positions.

Indeed, in a known way, the specific instant of occurrence of an astronomical phenomenon is variable depending on the terrestrial geographic position from which it is observed, so that the correlation of the images from various devices 10 increases the amount of information available for studying the phenomenon.

The respective pulse 36 and event 38 databases of both devices 10 comprise the same files, i.e. during the lighting step 510, the respective lighting sources 16 exactly emit the same sequence of light signals and this at the same instants in reference time.

Both of these aspects taken as a combination have the effect of allowing direct matching of the respective images from both devices 10.

It should be noted that the respective image sensing frequencies f, f' of the optical instruments 12 are generally distinct from each other.

With reference to the high (which corresponds to the images of the first device 10) and low (which corresponds to the images of the second device 10) portions of FIG. 3, considered simultaneously, this frequency difference is schematically expressed by different dimensions of the images along the time axis: the images of the first device 10 are less wide than those of the second device 10.

In the same way as previously, following the lighting 510 and image sensing 520 steps, the dating step 530 during which the images from the devices 10 are collected takes place and a date is determined in reference time for the image(s) from the first device 10 on which the observable phenomenon appears, and a date is determined in reference time for the image(s) from the second device 10 on which the observable phenomenon appears.

By subtraction of these dates, the time interval is obtained in reference time, which is involved between the observation of the phenomenon at the geographic position of the first device 10 and the observation of the phenomenon at the geographic position of the second device 10.

This alternative of the method according to the invention also allows confirmation of the identification of the observable phenomena when the method is applied for dating phenomena for which the occurrences are close and/or unpredictable, such as falling meteorites.

With reference to FIGS. 4 and 5, in a particular embodiment of this alternative wherein said or several of the optical instruments 12 of devices 10 are photometers, during the lighting step 510, the emission of a sequence of light signals with an intensity alternating between two given values is achieved. Thus for example, as illustrated on the left portion of FIG. 4, the emission by the lighting sources 16 of a light signal with an intensity having the value of 10% of the maximum intensity of the lighting source, and then 30% of the maximum intensity, and then again 10%, is achieved.

This is particularly advantageous when, always during the lighting step 510, the emission by the lighting sources 16 of a wave with a sinusoidal shape is also achieved.

Indeed, the sequence of light signals with a triangular shape operates like a time origin common to the sinusoidal waves emitted via the respective lighting sources 16 of the devices 10, which is easily identifiable. This common time origin makes it easier to match images of the various devices 10, notably because it suppresses any difficulty in identifying the beginning of the sequence of signals on the images of either one of the devices 10.

As this will have been understood, the features described earlier for a dating method 50 carried out by means of a single device 10 may be applied within the scope of the dating method 50 carried out by means of several devices 10.

In another embodiment of the dating method 50 according to this alternative, the lighting step 510 comprises first and second sub-steps 511, 512 carried out before, respectively after the expected occurrence of the observable phenomenon, which allows compensation for the drift of the image sensing frequency of the optical instruments 12 of the devices 10.

In another embodiment, one of the sub-steps 511, 512 is carried out during the occurrence of the observable phenomenon.

In another embodiment, the lighting step 510 begins before the image sensing step 520 and ends after the end of the latter.

Figure 7:
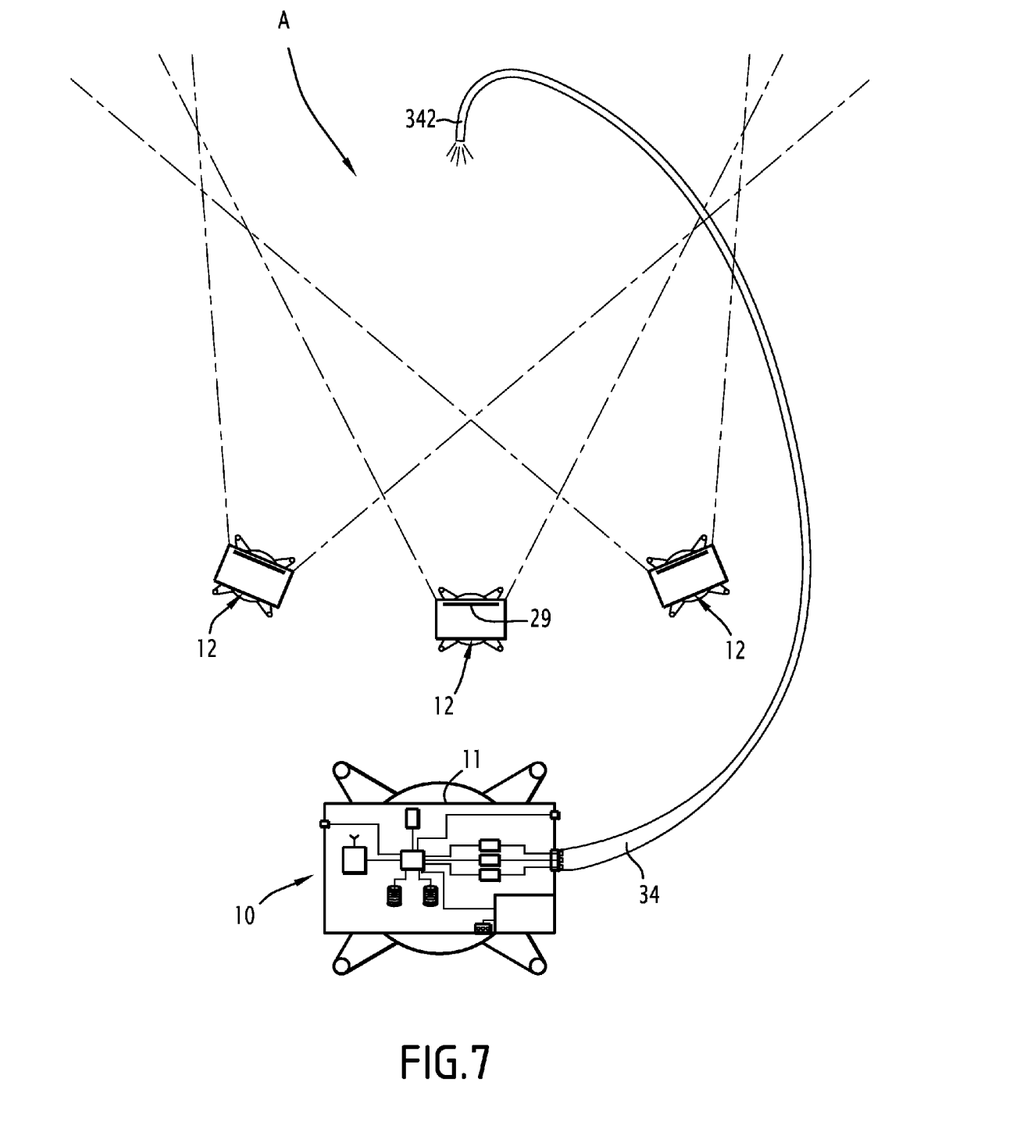
FIG. 7 is a schematic illustration of a device according to an alternative of the invention during a step of an alternative of the method of FIG. 2.

With reference to FIG. 7, another alternative of the dating method 50 will be described.

In this alternative, the method is applied via a device 10 comprising a plurality of optical instruments 12. This alternative allows correlation and determination of the synchronization level of the specific times of the different optical instruments 12 with the reference time.

In addition to the steps described earlier, the method 50 comprises a preliminary step 509 (in dotted lines in FIG. 2), during which the optical instruments 12 of the device 10 are laid out so that the different fields of view 30 converge towards each other and have a portion A common to all the fields of view 30.

Still during this preliminary step 509, the second end 342 of the wave guide 34 is positioned in the common portion A and is oriented towards the retinas 29 of the optical instruments 12.

During this preliminary step 509, the optical instruments 12 are positioned close to each other, so that the light signals are emitted by the second end of the wave guide 34 towards the retina 29 of at least one of the optical instruments 12, and preferentially of all the optical instruments 12.

In practice, the optical instruments 12 are positioned close to each other so that the light signals may be viewed on images produced by all the optical instruments 12, as opposed to a scenario when the optical instruments 12 are regularly spaced out around the common portion A, in which case the second end 342 would be oriented in a direction opposite to the retinas 29 of several optical instruments 12.

Further, during the lighting step 510, a light signal or a sequence of light signals are emitted by the lighting source 16 of the device 10 in the common portion A of the fields of view 30 of the retinas 29 of the different optical instruments, and towards these retinas 29.

The image sensing step 520 occurs in parallel with the lighting step 510, i.e. the optical instruments 12 produce images of their field of view 30 on which the light signals may be viewed.

During the dating step 530, from the different images produced by the optical instruments 12, the synchronization difference between the specific times of each of the optical instruments 12 with the reference time is determined.

In practice, for a given optical instrument 12, an image dated in the specific time of the optical instrument 12 is considered, on which appears a light signal. The date of the light signal in reference time and therefore of this image is known, which gives the synchronization difference between the specific time of the optical instrument and the reference time. This difference is then used for again finding the reference time of each of the images produced by the optical instrument 12 subsequently.

This alternative is advantageously applied for calibrating any number of optical instruments 12 within a given device 10, and this without requiring physical connection of the optical instruments with each other or with any synchronization device.

Further, insofar that the synchronization state of the different optical instruments 12 is determined from the images which they produce, the synchronization bias introduced by the internal process of image sensing of the optical instruments 12 is taken into account, as opposed to the scenario when this state is determined by directly accessing the specific time of the clock of the optical instrument.

The method 50 and the device 10, as well as the different previous embodiments and alternatives, have been described within the scope of astronomical applications, but are also suitable for being applied in other types of activity, for example in the field of road traffic or further in the field of monitoring industrial processes.

Alternatively, the method 50 is applied via at least two devices 10 respectively associated with one of the points of a given path over which moves an object which is desirably observed. The fields of view 30 of the optical instruments 12 of the devices are oriented towards the point of the corresponding path so that the relevant object passes into the field of view 30 of the optical instruments 12.

For more clarity, this alternative will be described in a non-limiting way in the case of two devices 10, the transposition to any number of devices 10 being made without any ambiguity.

In this alternative, during the image sensing step 520, images are produced on which the object is located at either one of the points of the path at which both devices 10 are respectively located.

During the dating step 530, the date in reference time of these images is obtained from images on which light signals appear, as described earlier.

Next, the time interval is determined in reference time which has elapsed between the passing of the object at the points of the path. To do this, the difference is made between the dates in reference time of the images produced during the image sensing step 520 on which the relevant object is found at these points of the path.

This alternative notably gives the possibility of obtaining a piece of information with increased accuracy relating to the average displacement velocity of an object on a path for which the length is known.

Thus, for example, this alternative of the method is applied via two devices 10 respectively positioned at either end of the ends of a road segment and allows calculation of the average speed of a vehicle over the relevant road segment. A first device 10 gives the possibility of dating in reference time the entry of the vehicle into the segment, and a second device 10 gives the possibility of dating in reference time the exiting of the vehicle from the segment.

Figure 8:
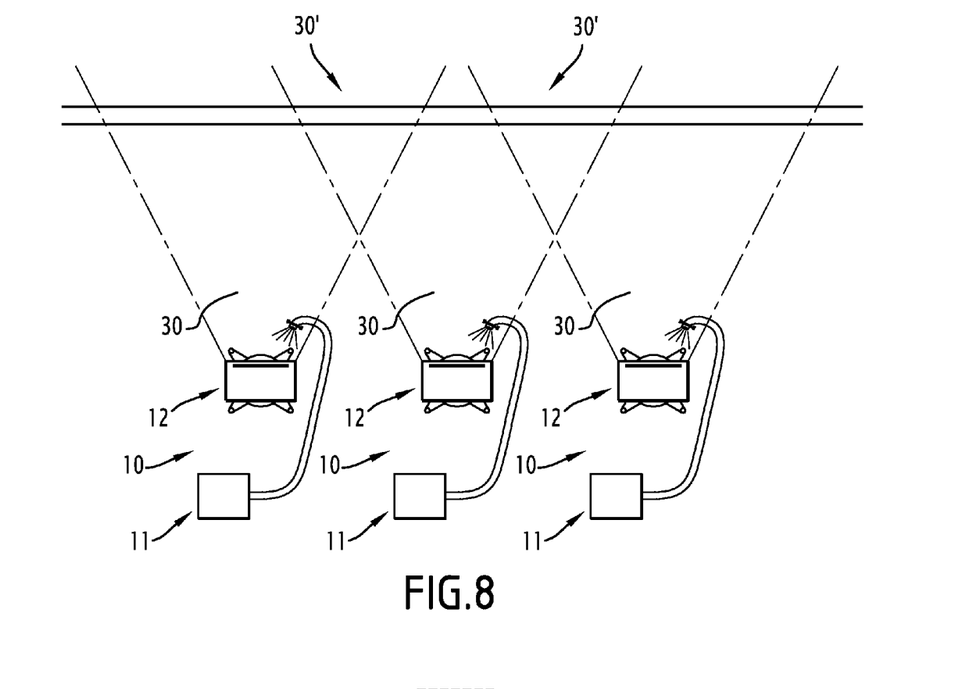
FIG. 8 is an illustration of a method according to an alternative of the invention.
Figure 9:
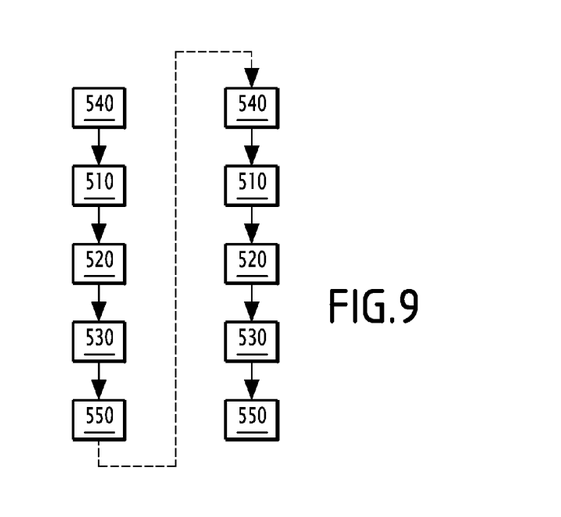
FIG. 9 is a block diagram illustrating a method according to an alternative of the invention.

In another embodiment, with reference to FIG. 8, this alternative is applied in order to follow the displacement of an object over the whole of a path.

In this embodiment, the method 50 is applied by means of devices 10 for which the respective optical means 12 are oriented towards the path so as to each cover a portion of the path, and so that any portion of the path is located in the field of view 30 of at least one optical instrument 12 of a device 10.

The respective fields of view 30 of two optical instruments 12 respectively associated with one of two successive path portions have a common sub-field of view 30'.

This has the effect that when the object passes from a portion of the path to another, continuity of the observation is ensured insofar that at least two sources of information are accessible.

This alternative is advantageously applied in order to obtain dated information in reference time and relating both to the time interval involved between the passages of the object between two given points on the path and to finer elements than the sole average speed of displacement of an object on this path.

For example, this alternative is applied in order to study the propagation of pollution over a given path along which devices 10 are positioned as described earlier.

In another alterative, with reference to FIG. 8, the method 50 is applied for calibrating optical instruments 12 located at different locations. To do this, each optical instrument 12 is successively coupled with the additional elements of the device 10, i.e. a case 11, control means 24, a lighting source 16, etc., so as to form a device 10 according to the invention.

More specifically, the method 50 according to this alternative includes a formation step 540 during which a device 10 is formed by coupling an optical instrument 12 with additional elements of the device 10, i.e. a case 11, a reference clock signal receiver 14, data storage means 18, electric power supply means 20, an external interface 22, an auxiliary output 23, control means 24 and a stabilizing leg 28.

In practice, as illustrated in FIG. 1, the elements grouped around and in the case 11 are associated with the optical instrument 12 in order to form the device 10.

Once the formation step 540 has been completed, the lighting 510 and image sensing 520 steps take place as described earlier by means of the thereby formed device 10. Next, during a dating step 530, the deviation between the specific time of the optical instrument 12 of the formed device 10 is determined from images produced on which a light signal appears for which the date is known in reference time. As earlier, this deviation is used for dating the images produced by the optical instruments 12 subsequently.

Then, during a separation step 550, the optical instrument 12 is separated from the other elements of the device 10.

These steps are then successively repeated for each optical instrument 12 which is desirably calibrated.

In a particular embodiment (not shown) of this alternative, the dating steps 530 are grouped in a single dating step 530 after the other steps, and during which the deviation between the specific time of the optical instruments and the reference time is determined, and this for all the optical instruments 12.

In other embodiments, the device 10 does not comprise any wave guide 34. The lighting source 16 positioned across the case 11 then emits light signals directly.

The embodiments and alternatives of the method 50 described are then applied by means of this alternative of the device 10 by directly positioning the case 11 of the device(s) 10 according to this alternative in the field of view 30 of the optical instrument(s) 12. The lighting source 16 is then oriented towards the retina 29 of the corresponding optical instrument(s) 12, so that the light signals are actually emitted towards the retina 29 of the optical instrument(s) 12 and in the corresponding field(s) view 30.

The attachment means 343 is then adapted for receiving the case 11 directly.

Depending on the embodiments, it may be motionally secured to an optical instrument 12.

The device 10 according to this alternative comprises less elements and is more lightweight, less cumbersome and easier to handle.

Within the scope of the invention, accurate measurements of the device 10 were conducted. These measurements related to:
- both on a first time deviation between the signal delivered by the auxiliary output 23, once the control means 24 are synchronized with a reference time, for example GPS time, on the one hand and a reference clock signal representative of the relevant reference time on the other hand, and
- on a second time deviation between the light signal emitted by the device 10 and the signal delivered by the auxiliary output 23.

The first time deviation is representative of the deviation between the time of the internal clock of the control means 24 and the reference time. The second time deviation is representative of an intrinsic inaccuracy of the device 10.

The obtained average value of the first time deviation has substantially the value of 10 microseconds with a standard deviation value of 0.4 microseconds.

The obtained average value of the second time deviation has the value of 5 microseconds.

Accordingly, the accuracy of the device 10 relatively to the reference time was measured as marred with a bias of about 15 microseconds and has a standard deviation of less than 0.5 microseconds.

The invention claimed is:

1. An optical time-stamping device, comprising:
   an optical instrument having a retina having a field of view and that produces images of said field of view on the retina,
   a high accuracy reference clock signal receiver configured for receiving a reference clock signal comprising information on a reference time,
   a lighting source at a distance from the retina of the optical instrument, the lighting source configured for emitting a light signal towards the retina of the optical instrument and in the field of view of the optical instrument, and
   control means comprising an internal clock, the control means connected to the reference clock signal receiver by a first connection and connected to the lighting source by a second connection, the control means configured for cyclically synchronizing their internal clock with the reference time and for controlling the lighting source for emitting the light signal in a synchronized way with the reference clock signal.

2. The time-stamping device according to claim 1, further comprising a case in which are integrated at least the reference clock signal receiver and the control means.

3. The time-stamping device according to claim 2, wherein the case is electrically independent of the optical instrument and/or is motionally secured to the optical instrument.

4. The time-stamping device according to claim 1, wherein the light signal from the lighting source is adjustable in intensity and/or in wavelength and/or in pulse width.

5. The time-stamping device according to claim 4, further comprising a pulse database that stores a plurality of pulse files, each pulse file comprising a plurality of pulse commands each comprising at least intensity, wavelength and/or pulse width parameters of the light signal from the lighting source.

6. The time-stamping device according to claim 5, further comprising an event database that stores a plurality of event files, each event file comprising one or several frames each comprising an event date, a pulse file name, and a number of iterations of said pulse file.

7. The time-stamping device according to claim 6, wherein the control means are programmed for reading said event files, and for each of the frames of an event file, controlling, at the event date in the reference time and a number of times equal to the number of iterations from said pulse file appearing in said frame, the emission by the lighting source of a sequence of the light signal of intensity, wavelength and pulse width corresponding to the intensity, wavelength and/or pulse width parameters comprised in the successive pulse commands, comprised in the pulse file, the name of which is found in the frame of the event file.

8. The time-stamping device according to claim 1, further comprising an auxiliary output that delivers a high level logic signal when the control means achieve control of the lighting source, and a low level logic one in the opposite case.

9. The time-stamping device according to claim 1, comprising at least two distinct optical instruments, the lighting source being configured so as to emit the light signal towards at least one of the optical instruments and in at least one of the respective fields of view of the optical instruments.

10. The time-stamping device according to claim 1, wherein said or each optical instrument is an element from the group consisting of a camera for observing visible light, an infrared camera, and a photometer.

11. An image sensing system, comprising at least two optical time-stamping devices according to claim 1.

12. An optical time-stamping method, using an optical time-stamping device according to claim 1, the method comprising:
  a lighting step, during which the lighting source of said or each time-stamping device emits at least one of the light signal towards the retina of at least one of the corresponding optical instruments and in the field of view of the corresponding optical instrument(s), said or each of the light signal being synchronized with the reference clock signal,
  an image sensing step at least partly taking place during the lighting step, during which said or each optical instrument of said or each time stamping device produces images of their field of view on which said at least one of the light signal may be viewed, and
  a dating step, during which a date in the reference time of images produced by said or each time-stamping device is determined.

13. The time-stamping method according to claim 12,
  wherein the optical time-stamping device further comprises at least two distinct optical instruments, the lighting source being configured so as to emit the light signal towards at least one of the optical instruments and in at least one of the respective fields of view of the optical instruments, and
  the time-stamping method further comprising a preliminary step during which the optical instruments of the device are laid out so that the fields of view of the optical instruments have a portion common to all the fields of view, and wherein during the lighting step, the lighting source emits at least one of the light signal in said common portion towards respective retinas of the optical instruments.

14. The time-stamping method according to claim 12,
  wherein the light signal from the lighting source is adjustable in intensity and/or in wavelength and/or in pulse width;
  wherein the optical time-stamping device further comprises a pulse database that stores a plurality of pulse files, each pulse file comprising a plurality of pulse commands each comprising at least intensity, wavelength and/or pulse width parameters of the light signal from the lighting source; and
  wherein the optical time-stamping device further comprises an event database that stores a plurality of event files, each event file comprising one or several frames each comprising an event date, a pulse file name, and a number of iterations of said pulse file,
  wherein the control means are programmed for reading said event files, and for each of the frames of an event file, controlling, at the event date in the reference time and a number of times equal to the number of iterations from said pulse file appearing in said frame, the emission by the lighting source of a sequence of the light signal of intensity, wavelength and pulse width corresponding to the intensity, wavelength and/or pulse width parameters comprised in the successive pulse commands, comprised in the pulse file, the name of which is found in the frame of the event file, and
  wherein during the image sensing step, the field of view of said or each optical instrument is oriented towards an observable phenomenon, and wherein during the dating step, the date in the reference time of the observable phenomenon is determined from the wavelength and/or the intensity of the light signal(s) from the lighting source of said or each time-stamping device and which may be viewed on the images produced at the image sensing step.

15. The time-stamping method according to claim 12, the method using at least two time-stamping devices respectively associated with at least one point of a path on which an object moves, wherein during the image sensing step, images are produced on which the object is located at the points with which are associated the time-stamping devices, and wherein during the dating step, a time interval involved between passages of the object at said points of the path is determined at least in the reference time.

16. The time-stamping method according to claim 12,
  wherein the light signal from the lighting source is adjustable in intensity and/or in wavelength and/or in pulse width;
  the method being applied by at least two optical time-stamping devices, each of said at least two optical time-stamping device further comprising:
  a pulse database that stores a plurality of pulse files, each pulse file comprising a plurality of pulse commands each comprising at least intensity, wavelength and/or pulse width parameters of the light signal from the lighting source; and
  an event database that stores a plurality of event files, each event file comprising one or several frames each comprising an event date, a pulse file name, and a number of iterations of said pulse file,
  wherein the control means are programmed for reading said event files, and for each of the frames of an event file, controlling, at the event date in the reference time and a number of times equal to the number of iterations from said pulse file appearing in said frame, the emission by the lighting source of a sequence of the light signal of intensity, wavelength and pulse width corresponding to the intensity, wavelength and/or pulse width parameters comprised in the successive pulse commands, comprised in the pulse file, the name of which is found in the frame of the event file,
  the pulse databases of said at least two time-stamping devices comprising the same event files and the same pulse files, wherein during the dating step, the images of said at least two time-stamping devices are collected and the images of at least two time-stamping devices are matched with each other from differences between the wavelengths and/or the intensities of each of the light signal which may be viewed on the respective images of said at least two time-stamping devices.

* * * * *